United States Patent
Bitar et al.

(10) Patent No.: US 7,493,197 B2
(45) Date of Patent: Feb. 17, 2009

(54) METHOD FOR EVALUATING AND SIGNALING LATERAL MANOEUVRING MARGINS ON BOTH SIDES OF THE PLANNED FLIGHT PLAN OF AN AIRCRAFT

(75) Inventors: Elias Bitar, Toulouse (FR); Nicolas Marty, Saint Sauveur (FR)

(73) Assignee: Thales (FR)

( * ) Notice: Subject to any disclaimer, the term of this patent is extended or adjusted under 35 U.S.C. 154(b) by 226 days.

(21) Appl. No.: 11/570,872

(22) PCT Filed: May 31, 2005

(86) PCT No.: PCT/EP2005/052474

§ 371 (c)(1),
(2), (4) Date: Dec. 18, 2006

(87) PCT Pub. No.: WO2005/124279

PCT Pub. Date: Dec. 29, 2005

(65) Prior Publication Data

US 2008/0039984 A1     Feb. 14, 2008

(30) Foreign Application Priority Data

Jun. 18, 2004  (FR) .................................. 04 06654

(51) Int. Cl.
*G08G 5/04* (2006.01)
*B64D 45/04* (2006.01)

(52) U.S. Cl. .............................. 701/14; 701/301; 342/29
(58) Field of Classification Search ................ 701/3–18, 701/301; 342/29–32; 340/945–983

See application file for complete search history.

(56) References Cited

U.S. PATENT DOCUMENTS

| 5,892,462 | A  | * | 4/1999  | Tran ............................ 340/961 |
| 6,088,654 | A  | * | 7/2000  | Lepere et al. ................ 701/301 |
| 6,292,721 | B1 | * | 9/2001  | Conner et al. ................... 701/9 |
| 6,480,120 | B1 | * | 11/2002 | Meunier ...................... 340/970 |
| 6,484,071 | B1 | * | 11/2002 | Conner et al. ................... 701/9 |
| 6,750,815 | B2 | * | 6/2004  | Michaelson et al. ..... 342/357.13 |
| 6,826,459 | B2 | * | 11/2004 | Conner et al. ................... 701/9 |

(Continued)

FOREIGN PATENT DOCUMENTS

EP    0 750 238 A    12/1996

(Continued)

*Primary Examiner*—Thomas G Black
*Assistant Examiner*—Shelley Chen
(74) *Attorney, Agent, or Firm*—Lowe Hauptman Ham & Berner, LLP

(57) ABSTRACT

The parts of the flight plan of an aircraft corresponding to lateral trajectories at low altitude can comprise passages with limited lateral freedom of deployment either because of risks of collision with the ground, or because of risks of penetration into a forbidden overfly zone. The method makes it possible to signal them for the attention of the crew, on the onboard navigation screen, so that said crew should redouble their attention. To do this it uses a detection procedure analogous to that of TAWS ground collision risk warning systems with protection envelopes related to the aircraft, of shapes suitable for the monitoring of the integrity of the spaces necessary for the aircraft to perform flat turns that are as tight as is permitted, while taking account of the local wind.

8 Claims, 3 Drawing Sheets

U.S. PATENT DOCUMENTS

| | | | |
|---|---|---|---|
| 7,098,810 B2 * | 8/2006 | Bateman et al. | 340/963 |
| 7,209,052 B2 * | 4/2007 | Artini et al. | 340/970 |
| 2003/0036828 A1 * | 2/2003 | Conner et al. | 701/9 |
| 2003/0112171 A1 * | 6/2003 | Michaelson et al. | 342/41 |
| 2004/0215372 A1 * | 10/2004 | Bateman et al. | 701/1 |
| 2005/0248470 A1 * | 11/2005 | Berthe | 340/961 |
| 2005/0258979 A1 * | 11/2005 | Artini et al. | 340/970 |
| 2006/0004497 A1 * | 1/2006 | Bull | 701/10 |
| 2007/0150117 A1 * | 6/2007 | Bitar et al. | 701/1 |

FOREIGN PATENT DOCUMENTS

| | | |
|---|---|---|
| EP | 0 750 238 A1 | 12/1996 |
| FR | 2 842 594 | 1/2004 |
| FR | 2 842 594 A | 1/2004 |
| FR | 2842594 A1 * | 1/2004 |
| WO | WO 2004010079 A2 * | 1/2004 |

* cited by examiner

METHOD FOR EVALUATING AND SIGNALING LATERAL MANOEUVRING MARGINS ON BOTH SIDES OF THE PLANNED FLIGHT PLAN OF AN AIRCRAFT

CROSS-REFERENCE TO RELATED APPLICATIONS

The present Application is based on International Application No. PCT/EP2005/052474, filed on May 31, 2005, which in turn corresponds to French Application No. 04 06644 filed on Jun. 18, 2004, and priority is hereby claimed under 35 USC §119 based on these applications. Each of these applications are hereby Incorporated by reference in their entirety into the present application.

FIELD OF THE INVENTION

The present invention relates to onboard navigation aid for aircraft following a flight plan part corresponding to a lateral trajectory at low altitude that may comprise passages with limited lateral freedom of deployment either because of risks of collision with the ground, or because of risks of penetration into a forbidden overfly zone. It relates to the display, for the attention of the crew of an aircraft, of the passages of the trajectory of the flight plan subject to limitations of lateral freedom of deployment.

BACKGROUND OF THE INVENTION

Known among onboard navigation aid systems for aircraft following trajectories relatively close to the ground, are ground collision risk warning systems termed TAWS (acronym standing for the expression: "Terrain Awareness and Warning System"). These TAWS systems emit alarms regarding the need to modify, in the shorter or not so short term, the trajectory followed so as to avoid a collision with the relief and obstacles on the ground, or the penetration into a forbidden overfly zone. They base their alarms on the penetration of the relief or of an obstacle on the ground or the passage of a forbidden overfly zone, into or under one or more protection volumes related to the aircraft and extending ahead of and below the current position of the aircraft. The relief, the obstacles on the ground and the forbidden overfly zones are catalogued in a topographic map of the region overflown formulated on the basis of a terrain elevation database onboard or consultable from the aircraft. The protection volume or volumes related to the current position of the aircraft are dimensioned so as to contain the majority of the disengagement trajectories within the range of the aircraft, in relation to a possible relief, obstacle or forbidden overfly zone situated on its short-term forecastable trajectory.

These TAWS ground collision risk warning systems are only concerned with ground collision risks presented by the short-term forecastable trajectory of the aircraft, deduced from its current position and its speed and acceleration vectors at the time. They do not advise the crew as to its lateral margins of maneuver.

To respond to this requirement, the Applicant has already proposed, in a French patent application FR 2.842.594, an onboard navigation aid system for aircraft alerting the crew of an aircraft as to the time remaining for it to embark on lateral disengagement maneuvers, when there appear restrictions to its lateral margins of maneuver on either side of a fictitious trajectory such as its short-term forecastable trajectory. More precisely, this system implements a method consisting in:

defining two zones to be probed, one to the right and the other to the left, of a fictitious trajectory to be traversed, designated by prober support trajectory, probing, for each of the two zones to be probed to the right and to the left, a subjacent relief with a view to identifying dangerous sub-zones to the right and/or to the left, calculating for each of the dangerous sub-zones to the right and/or to the left, a time $\Delta T$ remaining to start a disengagement maneuver before a point of no return, and determining for the dangerous sub-zones to the right a minimal $\Delta T$ denoted $\Delta T$ right and/or for the dangerous sub-zones to the left a minimal $\Delta T$ denoted $\Delta T$ left, and establishing a navigation aid on the basis of $\Delta T$ right and/or $\Delta T$ left.

SUMMARY OF THE INVENTION

In view of the foregoing it is an object of this invention to advise the crew of an aircraft not as to the timescale remaining for it to embark on a possible lateral disengagement maneuver but as to the passages of the trajectory scheduled in its flight plan where it will encounter limitations of its lateral margins of maneuver.

Briefly stated, the present invention is directed to a method for evaluating and signaling the lateral margins of maneuver on either side of a trajectory scheduled in the flight plan of an aircraft furnished with a locating device and with a cartographic device formulating, on the basis of a topographic database onboard or accessible from onboard, an envelope of the terrain overflown. This method comprises the steps of:

generation, on the basis of a position of the aircraft traveling along the trajectory scheduled in its flight plan, of two adjoining lateral protection envelopes, right and left extending one to the right and the other to the left of a navigation band centered on the trajectory scheduled in the flight plan and of width taking account of the uncertainties of location of the aircraft, of the inaccuracy of the envelope of the terrain overflown delivered by the cartographic device and of the lateral tolerance accepted in the tracking of the trajectory scheduled in the flight plan, the right lateral protection envelope delimiting a sufficient volume to allow the aircraft to perform at least one half-revolution, flat, to the right, during a turn with imposed radius, the left lateral protection envelope also delimiting a sufficient volume to allow the aircraft to perform at least one half-revolution, flat to the left, during a turn with imposed radius, and detection of the intrusions of the envelope of the terrain overflown into the right and left lateral protection envelopes.

It is noteworthy in that it furthermore comprises a step of signaling of the passages of the trajectory scheduled in the flight plan with reduced margins of lateral maneuver on the right and/or on the left corresponding to detections of intrusion of the envelope of the terrain overflown into one and/or the other of the right or left lateral protection envelopes.

Advantageously, when a part of the trajectory scheduled in the flight plan is displayed on a navigation map, the step of signaling consists in indicating a limitation of lateral margin of maneuver at a point of the displayed part of the trajectory scheduled in the flight plan by a doubling of the plot of the trajectory at the point concerned, on the side of each right or left lateral protection envelope having undergone an intrusion of the envelope of the terrain overflown.

Advantageously, the right and left lateral protection envelopes are dimensioned so as to delimit a sufficient volume to allow the aircraft to perform a complete revolution, flat, to the right or to the left while taking account of the local wind.

Advantageously, the turning radius imposed for the complete revolutions, flat, to the right and to the left is a permitted minimum turning radius for the aircraft considered.

Advantageously, a right or left lateral protection envelope is of parallelepipedal shape, with a horizontal lower face placed below the aircraft at a vertical distance corresponding to a safety height margin increased by a margin of maneuver of return to the horizontal, two vertical lateral faces, one tangent to the course of the aircraft, the other shifted laterally from the aircraft by the necessary distance required by the aircraft to accomplish a half-revolution taking account of the local wind and the imposed turning radius, a vertical frontal face and a vertical rear face having the course of the aircraft as director axis, the frontal face being placed ahead of the aircraft at a distance corresponding to that necessary for the aircraft to accomplish a quarter of a revolution taking account of the local wind and the imposed turning radius, and the rear face being spaced from the front face by the distance necessary for the aircraft to supplement the quarter of a revolution with a half-revolution taking account of the local wind and the imposed turning radius.

Advantageously, the longitudinal dimensions of the right and left lateral protection envelopes are dependent on the imposed turning radius and the positions, with respect to the aircraft, of the points of the ground traces of the turns with the imposed radius corresponding, for the aircraft, to a vanishing of its speed component parallel to the course scheduled in the flight plan.

Advantageously, the lateral dimensions of the right and left lateral protection envelopes are dependent on the imposed turning radius and the positions, with respect to the aircraft, of the points of the ground traces of the turns with the imposed radius corresponding, for the aircraft, to a vanishing of its speed component perpendicular to the course scheduled in the flight plan.

Advantageously, the right and left lateral protection envelopes have one and the same longitudinal dimension.

Advantageously, the right and left lateral protection envelopes have as longitudinal dimension the sum of a component $L_f$, directed towards the front of the aircraft, taken equal to the largest value out of:
the turning diameter 2R whose value is given by:

$$R = \frac{TAS^2}{g \cdot \tan\varphi_{roll}},$$

TAS being the amplitude of the air speed of the aircraft,
$\varphi_{roll}$ being the angle of roll of the aircraft during the turning maneuver,
g being the acceleration due to gravity, and
the values taken by the component $y_t$ parallel to the course scheduled in the flight plan, of the separation of the positions on the ground traces of turns to the right and to the left, with the imposed radius, at the times $t_{Lr1}$, $t_{Ll1}$ and $t_{Lr2}$, $t_{Ll2}$ of the first and second vanishings of the aircraft's speed component parallel to the course scheduled in the flight plan $L_f$=Max $[2R; y_t(t_{Ll1}); y_t(t_{Ll2}); y_t(t_{Lr1}); y_t(t_{Lr2})]$ and of a component $L_r$, directed towards the rear of the aircraft, taken equal to the absolute value of the smallest of the values taken by the component $y_t$ parallel to the course scheduled in the flight plan on the ground traces of the turns to the right and to the left, with the imposed radius, at the times $t_{Lr1}$, $t_{Ll1}$ and $t_{Lr2}$, $t_{Ll2}$ of the first and second vanishings of the aircraft's speed component parallel to the course scheduled in the flight plan:

$L_r$=Abs(Min$[y_t(t_{Ll1}); y_t(t_{Ll2}); y_t(t_{Lr1}); y_t(t_{Lr2})]$)

Advantageously, the lateral dimensions of the two right and left lateral protection envelopes have as lateral dimensions, the one, the right one $W_r$, the largest value out of:
the turning diameter 2R whose value is given by:

$$R = \frac{TAS^2}{g \cdot \tan\varphi_{roll}},$$

TAS being the amplitude of the air speed of the aircraft,
$\varphi_{roll}$ being the angle of roll of the aircraft during the turning maneuver, and
the values taken by the component $x_t$ perpendicular to the course scheduled in the flight plan on the ground trace of the turn with imposed radius, at the times $t_{Wr1}$ and $t_{Wr2}$ of the first and second vanishings of the aircraft's speed component perpendicular to the course scheduled in the flight plan, increased by the width Wn of the navigation band:

$W_r$=Max $[2R; x_t(t_{Wr1}); x_t(t_{Wr2})]+Wn$ with $\delta=+1$ and the other, the left one $W_l$, the largest out of:
the turning diameter 2R, and,
the opposites of the values taken by the component $x_t$ perpendicular to the course scheduled in the flight plan on the ground trace of the turn with imposed radius, at the times $t_{Wl1}$ and $t_{Wl2}$ of the first and second vanishings of the aircraft's speed component perpendicular to the course scheduled in the flight plan increased by the width Wn of the navigation band:

$W_l$=Max$[2R; -x_t(t_{Wl1}); -x_t(t_{Wl2})]+Wn$ with $\delta=-1$

BRIEF DESCRIPTION OF THE DRAWING

Other characteristics and advantages of the invention will emerge from the description hereafter of an exemplary embodiment. This description will be offered in relation to the drawing in which:

a FIG. 1 is a view in perspective of an aircraft describing a flight plan trajectory at relatively low altitude above the relief, and of the right and left lateral protection envelopes which are associated therewith in accordance with the invention, a FIG. 2 illustrates a navigation map showing a flight plan trajectory with a signaling of restriction of lateral margins of maneuver, in accordance with the invention, a FIG. 3 illustrates, in horizontal projection, circular trajectories corresponding to flat turns performed by the aircraft, at constant speed and constant angle of roll in the absence of local wind, a FIG. 4 illustrates the ground traces, in the form of cycloidal arches, of the circular trajectories shown in FIG. 3 resulting from the presence of a local crosswind, and a FIG. 5 shows a vertical trajectory profile corresponding to a flattening out of an aircraft initially descending, before the execution of a flat turn.

DETAILED DESCRIPTION OF THE DRAWING

Figure 1:
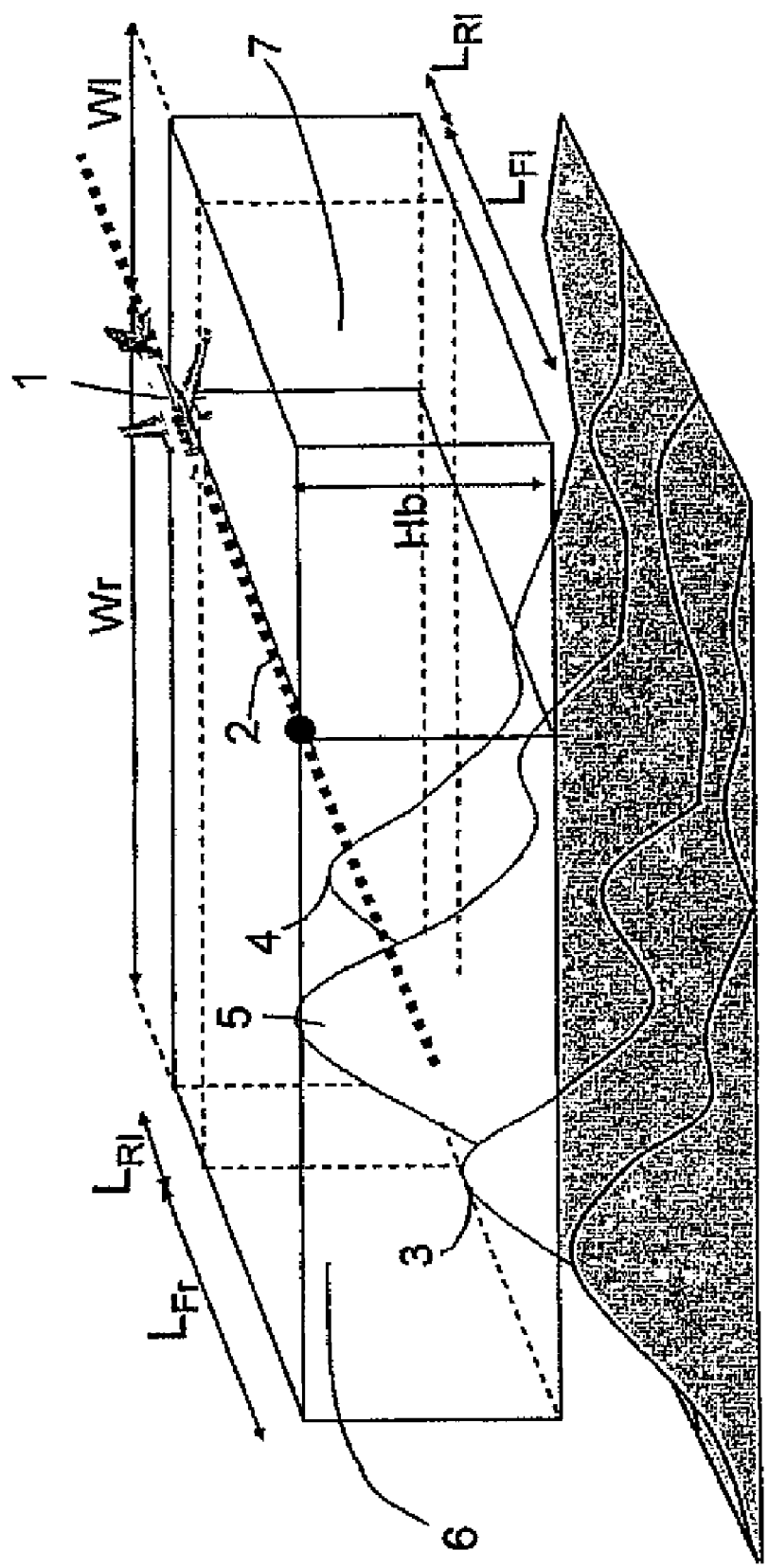

FIG. 1 shows an aircraft 1 following, at relatively low altitude, a trajectory 2 scheduled in its flight plan, for example an approach trajectory to a landing strip surrounded by mountains. Elements of the relief 3, 4, 5 relatively close laterally to the trajectory of the aircraft, reach altitudes comparable to or greater than that of the trajectory 2 scheduled in the flight plan and limit the margins for flat lateral maneuvers. It is important that the crew of the aircraft 1 be aware of these limitations in the case where they ought, for one reason or another, to exit the trajectory 2 scheduled in the flight plan.

To attract the attention of the crew of an aircraft to restrictions to its freedom of flat maneuver resulting from risks of collision with reliefs, obstacles on the ground or risks of penetrating forbidden overfly zones, we propose to use a technique derived from that of the TAWS ground collision risk warning systems by adapting to this problem, on the one hand, the shape of the protection volume related to the aircraft into which no relief or obstacle on the ground should penetrate and which should not pass above forbidden overfly zones and on the other hand, the utilization of the detections of intrusion or of passage with respect to the protection volume.

The shape of the protection volume related to the aircraft 1 is no longer determined so as to gather up the majority of the disengagement trajectories within the range of the aircraft 1 in case of unexpected presence of a relief, of an obstacle on the ground or of a forbidden overfly zone on its short-term forecastable trajectory, but so as to be certain of the freedoms of flat maneuver of the aircraft along the whole of the trajectory part scheduled in its flight plan and displayed on a navigation map. This leads to the protection volume related to the aircraft 1 being given the shape of two adjoining protection envelopes, one to the right 6, the other to the left 7 enclosing the spaces necessary for the aircraft 1 to perform a complete revolution, flat, with an imposed turning radius and while taking account of the local wind, to the right for the right lateral protection envelope 6 and to the left for the left lateral protection envelope 7. Thus, each of the lateral protection envelopes 6, 7 extends horizontally:

- ahead of the aircraft 1, in a position traveling along the trajectory 2 scheduled in the flight plan, over distances $L_{Fr}$, $L_{Fl}$ sufficient to allow the aircraft 1 to perform a quarter of a revolution, horizontally, on the right or left side by performing a turn with the imposed radius and taking account of the local wind,
- to the sides of the aircraft, in a position traveling along the trajectory 2 scheduled in the flight plan, over distances $W_r$, $W_l$ sufficient to allow the aircraft 1 to perform a half-revolution to the right or to the left by performing a turn with the imposed radius and taking account of the local wind,
- directed towards the rear of the aircraft 1, in a position traveling along the trajectory 2 scheduled in the flight plan, over distances $L_{Rr}$, $L_{Rl}$ sufficient to allow the aircraft 1 to perform three quarters of a revolution to the right or to the left by performing a turn with the imposed radius and taking account of the local wind, and
- downward from the aircraft 1, in a position traveling along the trajectory 2 scheduled in the flight plan, over a sufficient height $H_b$ to take account of a safety margin and of a possible flattening out maneuver (case where the flight plan trajectory is a descending trajectory, for example when approaching a strip surrounded by mountains).

By simplification, the two right and left lateral protection envelopes 6 and 7 have the shape of two adjoining right-angled parallelepipeds with lateral edges parallel to the course of the aircraft 1 in its current position, and common dimensions $L_{Fr}$, $L_{Fl}$ and $L_{Rr}$, $L_{Rl}$.

As regards the detection of limitations of the lateral margins of maneuver of an aircraft, at a point of its trajectory scheduled in the flight plan, these two right and left lateral protection envelopes 6 and 7 are used as in TAWS ground collision risk warning systems, by monitoring the penetration of a relief or obstacle on the ground into their interior volumes or the passage of these protection envelopes above a forbidden overfly zone. The monitoring consists here in detecting on the one hand the penetration through the front and lower faces of these lateral protection envelopes 6 and 7 of an envelope of the terrain overflown which is formulated on the basis of a terrain elevation database onboard or consultable from the aircraft while taking account of a margin of uncertainty of measurement of the elevations of the points of the database and of an margin of uncertainty of measurement of the location of the aircraft, and which catalogues reliefs and obstacles on the ground and/or forbidden overfly zones, and on the other hand, the passage, below these right and left lateral protection envelopes 6 and 7, of a forbidden overfly zone, catalogued in the envelope of the terrain overflown.

For the signaling of the reduced lateral margins of maneuver, use is made of a navigation map displayed on the instrument panel of the aircraft whereon is depicted a greater or lesser part of the lateral trajectory of the flight plan remaining to be traversed. The current position of the aircraft 1 associated with the two right and left lateral protection envelopes 6 and 7 is made to describe, virtually, the displayed part of the lateral trajectory scheduled in the flight plan, and each position of the lateral trajectory of the flight plan where a detection of penetration of relief or of obstacles on the ground, or a passage over a forbidden overfly zone occurs, is marked on the navigation map by a distinctive sign, for example a doubling of the trajectory of the flight plan at the point concerned, on the side of the lateral protection envelope 6, 7 at issue as shown in FIG. 2.

Figure 2:
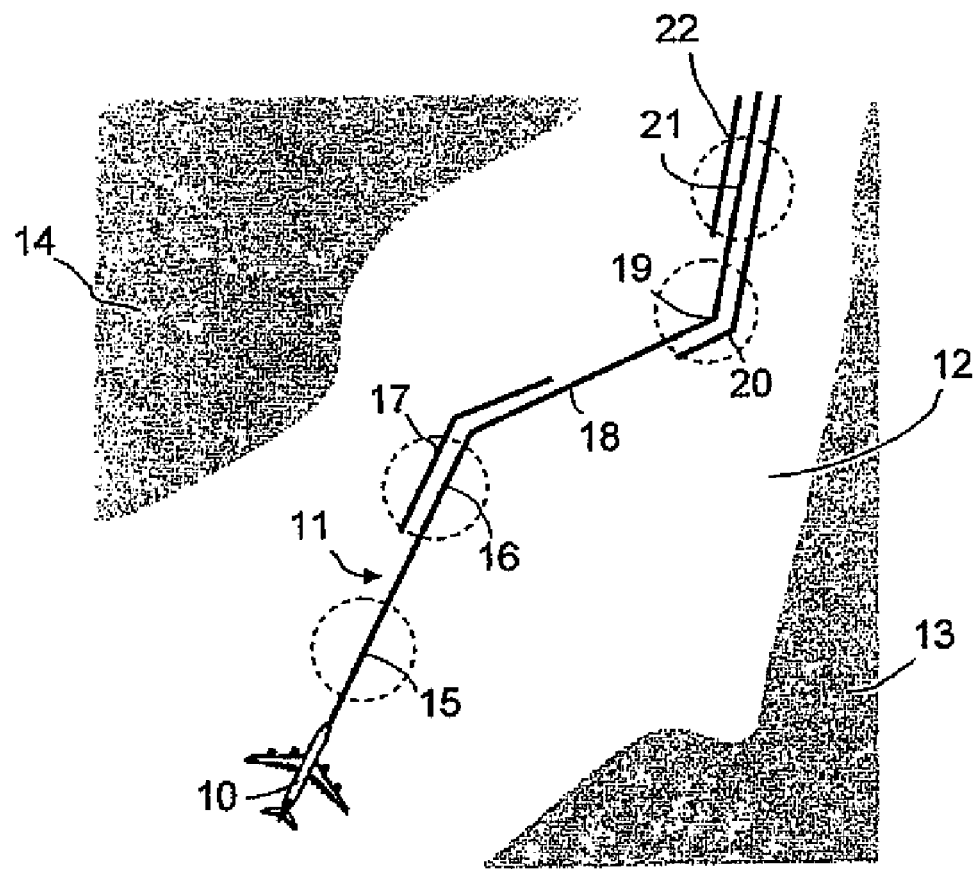

In this FIG. 2 is distinguished an aircraft 10 having to traverse a displayed part 11 of trajectory scheduled in the flight plan following a corridor 12 between two mountainous reliefs 13 and 14. The mountainous reliefs 13, 4 are uncrossable by an aircraft 10 complying with the vertical trajectory associated with the lateral trajectory displayed part 11 since they are assumed to have altitudes exceeding that of the safety floor assigned in the flight plan to the lateral trajectory part 11. When the aircraft 10 traverses the lateral trajectory part 11 virtually, it loses its freedom of flat lateral maneuver as soon as the mountainous reliefs 10, 11 penetrate into one 6 or 7 of the lateral protection envelopes.

At the start 15 of the traversal of the lateral trajectory part 11, the mountainous reliefs 13, 14 do not penetrate into the two lateral protection envelopes. No restriction of lateral margin of maneuver is signaled since the aircraft 10 has the possibility of performing a disengagement maneuver, flat, to the right or the left by tightening its turn to the permitted maximum.

On the first third of the traversal, at 16, the mountainous relief 14 penetrates into the left lateral protection envelope signifying that it is too close to the lateral trajectory of the flight plan to allow the aircraft to perform a disengagement maneuver, flat, on the left even by tightening its turn to the permitted maximum. The lateral margin of maneuver of the aircraft 10 on the left is therefore limited. This is signaled on the map by a doubling on the left, at 17, of the part concerned of the lateral trajectory 11 of the flight plan. On the right side, still on the first third of the traversal, at 16, the mountainous relief 13 is sufficiently far away not to penetrate into the right lateral protection envelope. The lateral margin of maneuver of the aircraft 10 on the right is not limited. There is therefore no signaling of restriction of margin of maneuver on the right. The lateral trajectory of the flight plan is doubled only on the left.

At mid-traversal, at 18, the lateral trajectory of the flight plan deviates from the left flank of the corridor 12 without approaching too closely the right flank of the corridor 12, to the point that the mountainous relief 14 deserts the left lateral protection envelope without however the mountainous relief 13 penetrating into the right lateral protection envelope. The signaling of restriction of margin of lateral maneuver on the left disappears. There are no longer any restrictions of the margins of lateral maneuver.

At two thirds of the traversal, at 19, the right flank of the corridor 12 approaches sufficiently close to penetrate into the right lateral protection envelope signifying a limitation of the lateral margin of maneuver of the aircraft 10 on the right forbidding the aircraft 10 to perform a disengagement maneuver, flat, on the right even by tightening the turn to the permitted maximum. This is signaled on the map by a doubling on the right, at 20, of the part concerned of the lateral trajectory 11 of the flight plan.

At the conclusion of the traversal, at 21, the corridor 12 tightens sufficiently for its right and left flanks to penetrate into the two right and left lateral protection envelopes signifying limitations of the margins of lateral maneuver of the aircraft 10 both on the right and on the left forbidding it to perform a disengagement maneuver, flat, on the right or on the left, even by tightening its turn to the permitted maximum. This is signaled on the map by a doubling on the right, at 20, and by a doubling on the left at 22 of the part concerned of the lateral trajectory 11 of the flight plan.

To fix the dimensions in the horizontal plane of the right and left lateral protection envelopes, we take as a basis an estimation of the longitudinal and lateral dimensions of the horizontal areas occupied by the ground trace of the trajectory traversed by the aircraft when it performs a complete revolution, flat, by tightening the turn to the permitted maximum and in the presence of a local wind. For this estimation, one begins by establishing the parametric equations for the ground trace in the absence of local wind, then, in the presence of local wind, in reference frames related to the course of the aircraft (track) and to the axes of the longitudes and latitude. One is thereafter concerned with the points of this trace where the longitudinal speed (parallel to the course scheduled in the flight plan) or lateral speed (perpendicular to the course scheduled in the flight plan) vanishes.

Figure 3:
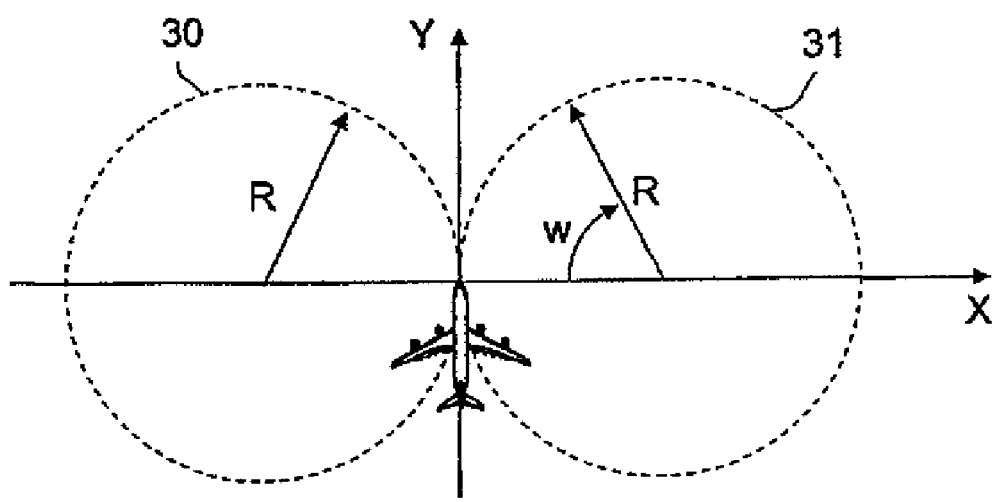

As represented in FIG. 3, in the absence of local wind, the trajectories of the aircraft performing a complete revolution, flat, from a point of the lateral trajectory scheduled in the flight plan, by tightening the turn to the permitted maximum, on the right side, or on the left side are circles 30, 31 passing through the starting position on the trajectory scheduled in the flight plan, having a common tangent oriented according to the heading of the aircraft (vector $\vec{Y}$) and a radius R corresponding to the smallest acceptable turning radius at the time. These circles 30, 31, which represent the tightest permitted turning trajectories, on one side or the other, for the aircraft, comply with the system of parametric equations:

$$\begin{pmatrix} x \\ y \end{pmatrix}(t) = \begin{pmatrix} \delta \cdot R \cdot [1 - \cos(wt + \gamma)] \\ R \cdot \sin(wt + \gamma) \end{pmatrix} \quad (1)$$

with

-continued $$R = \frac{TAS^2}{g \cdot \tan\varphi_{roll}}$$

$$w = \frac{TAS}{R} = \frac{g \cdot \tan\varphi_{roll}}{TAS}$$

TAS being the amplitude of the air speed of the aircraft, g being the acceleration due to gravity, $\varphi_{roll}$ being the angle of roll of the aircraft during the maneuver, $\gamma$ being a factor dependent on the initial conditions, $\delta$ being a coefficient equal to +1 for a turn to the right and −1 for a turn to the left.

The air speed of the aircraft, when it traverses these circles may then be written:

$$\begin{pmatrix} \dot{x} \\ \dot{y} \end{pmatrix}(t) = \begin{pmatrix} \delta \cdot Rw \cdot \sin(wt + \gamma) \\ Rw \cdot \cos(wt + \gamma) \end{pmatrix} \quad (2)$$

Figure 4:
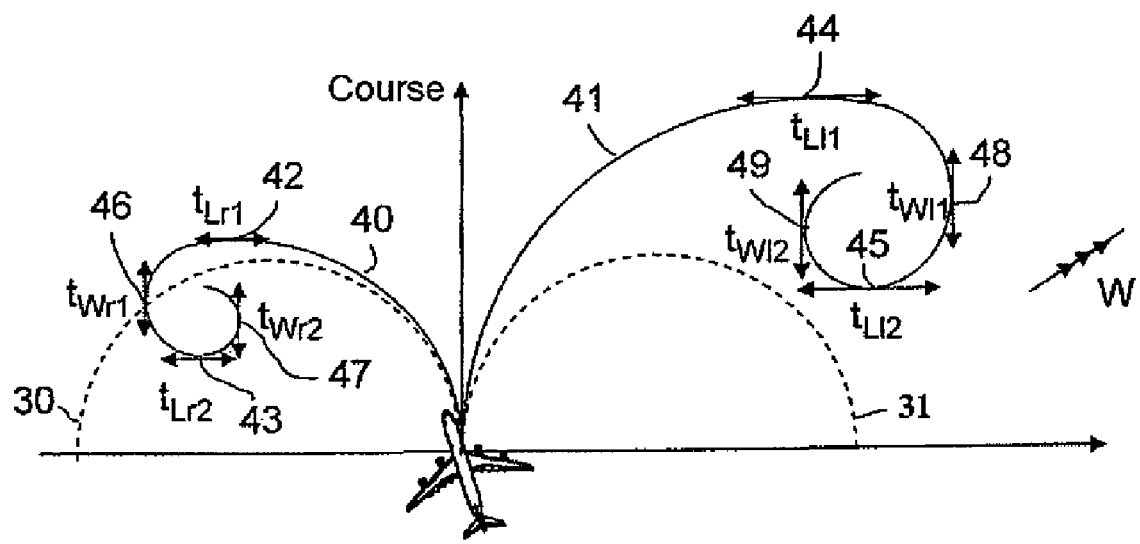

In the presence of a local wind that is constant in speed and in direction, the circles 30, 31 leave traces 40, 41 on the ground in the form of cycloidal arches, as is represented in FIG. 4. The system of parametric equations of a ground trace can be obtained by integrating the system of parametric equations for the air speed of traversal over the corresponding circle.

When the wind is taken into account, the system (2) of parametric equations for the speed of the aircraft, expressed in a ground reference frame X Y whose ordinate axis Y is oriented according to the heading of the aircraft, becomes:

$$\begin{pmatrix} \dot{x} \\ \dot{y} \end{pmatrix}(t) = \begin{pmatrix} \delta \cdot Rw \cdot \sin(wt + \gamma) + WS_X \\ Rw \cdot \cos(wt + \gamma) + WS_Y \end{pmatrix}$$

$\begin{pmatrix} WS_X \\ WS_Y \end{pmatrix}$ being the wind vector.

By integration, we obtain, in this ground reference frame, the system of parametric equations for the trace:

$$\begin{pmatrix} x \\ y \end{pmatrix}(t) = \begin{pmatrix} WS_X \cdot t - \delta \cdot R \cdot \cos(wt + \gamma) + C_X \\ WS_Y \cdot t + R \cdot \sin(wt + \gamma) + C_Y \end{pmatrix}$$

$C_x$ and $C_y$ being integration constants which depend on the reference frame considered.

In an air reference frame $X_h$, $Y_h$ whose ordinate axis Y is oriented according to the heading of the aircraft the system of parametric equations (2) becomes:

$$\begin{pmatrix} \dot{x} \\ \dot{y} \end{pmatrix}(t) = \begin{pmatrix} \delta \cdot Rw \cdot \sin(wt + \gamma) + WS_{X_h} \\ Rw \cdot \cos(wt + \gamma) + WS_{Y_h} \end{pmatrix} \quad (3)$$

By integration, it gives, in this air reference frame, the system of parametric equations for the ground trace:

$$\begin{pmatrix} x \\ y \end{pmatrix}_h (t) = \begin{pmatrix} WS_{X_h} \cdot t - \delta \cdot R \cdot \cos(wt + \gamma_h) + C_{X_h} \\ WS_{Y_h} \cdot t + R \cdot \sin(wt + \gamma_h) + C_{Y_h} \end{pmatrix} \quad (4)$$

The initial condition regarding position is:

$$\begin{pmatrix} x \\ y \end{pmatrix}_{t=0} = \begin{pmatrix} 0 \\ 0 \end{pmatrix} \quad (5)$$

since the aircraft is initially at the center of the reference frame. The initial condition regarding speed is:

$$\begin{pmatrix} \dot{x} \\ \dot{y} \end{pmatrix}_{t=0} = \begin{pmatrix} WS_{X_h} \\ TAS + WS_{Y_k} \end{pmatrix} \quad (6)$$

since the aircraft has a speed vector oriented initially according to the course axis $\vec{Y}$.

At the initial instant t=0, the equation system (3) gives for initial air speed:

$$\begin{pmatrix} \dot{x} \\ \dot{y} \end{pmatrix}_{t=0} = \begin{pmatrix} \delta \cdot Rw \cdot \sin(\gamma) + WS_{X_h} \\ Rw \cdot \cos(\gamma) + WS_{Y_h} \end{pmatrix}$$

The initial speed condition (relation 6) implies:

$$\begin{cases} \cos(\gamma_h) = 1 \\ \sin(\gamma_h) = 0 \end{cases} \Rightarrow \gamma_h = 0$$

Taking account of these relations in the system of equations (4), it follows that:

$$\begin{pmatrix} x \\ y \end{pmatrix}_h (0) = \begin{pmatrix} -\delta \cdot R \cdot + C_{X_h} \\ C_{V_h} \end{pmatrix}$$

and the initial position condition (relation 5) implies:

$C_{X_h} = \delta \cdot R$ $C_{y_h} = 0$

In a ground reference frame $X_t Y_t$, whose ordinate axis $Y_t$ is oriented according to the course (track) of the aircraft (case of FIG. 4), the system of parametric equations (2) becomes:

$$\begin{pmatrix} \dot{x} \\ \dot{y} \end{pmatrix}_t (t) = \begin{pmatrix} \delta \cdot Rw \cdot \sin(wt + \gamma_t) + WS_{X_t} \\ Rw \cdot \cos(wt + \gamma_t) + WS_{Y_t} \end{pmatrix} \quad (7)$$

By integration, it gives, in this ground reference frame, the system of parametric equations for the trace:

$$\begin{pmatrix} x \\ y \end{pmatrix}_t (t) = \begin{pmatrix} WS_{X_t} \cdot t - \delta \cdot R \cdot \cos(wt + \gamma_t) + C_{X_t} \\ WS_{Y_t} \cdot t + R \cdot \sin(wt + \gamma_t) + C_{Y_t} \end{pmatrix} \quad (8)$$

The initial position condition:

$$\begin{pmatrix} x \\ y \end{pmatrix}_t (0) = \begin{pmatrix} 0 \\ 0 \end{pmatrix}$$

expressing that the aircraft is initially at the center of the reference frame, and the initial speed condition:

$$\begin{pmatrix} \dot{x} \\ \dot{y} \end{pmatrix}_t (0) = \begin{pmatrix} 0 \\ GS \end{pmatrix}$$

expressing that the aircraft has a speed vector oriented initially according to the course axis $\vec{t}$ lead to the values of integration constants:

$C_{xt} = \delta \cdot R \cdot \cos(\gamma_t)$ $C_{Yt} = -R \cdot \sin(\gamma_t)$ $\gamma_t = -\delta \cdot (\text{Track–Heading})$ In the customary geographical reference frame of navigation maps $X_g Y_g$ which uses longitude and latitude axes, the system of parametric equations (1) becomes:

$$\begin{pmatrix} \dot{x} \\ \dot{y} \end{pmatrix}_g (t) = \begin{pmatrix} \delta \cdot Rw \cdot \sin(wt + \gamma_g) + WS_{X_g} \\ Rw \cdot \cos(wt + \gamma_g) + WS_{Y_g} \end{pmatrix}$$

By integration, it gives, in this geographical reference frame, the system of parametric equations for the trace:

$$\begin{pmatrix} x \\ y \end{pmatrix}_g (t) = \begin{pmatrix} WS_{X_g} \cdot t - \delta \cdot R \cdot \cos(wt + \gamma_g) + C_{X_g} \\ WS_{Y_g} \cdot t + R \cdot \sin(wt + \gamma_g) + C_{Y_g} \end{pmatrix}$$

The initial position condition:

$$\begin{pmatrix} x \\ y \end{pmatrix}_g (0) = \begin{pmatrix} \text{Long} \\ \text{Lat} \end{pmatrix}$$

and the initial speed condition:

$$\begin{pmatrix} \dot{x} \\ \dot{y} \end{pmatrix}_g (0) = \begin{pmatrix} GS \cdot \sin(\text{track}) \\ GS \cdot \cos(\text{track}) \end{pmatrix}$$

lead to the values of integration constants:

$$C_{x_g} = \text{Long} + \delta.R.\cos(\gamma_g)$$

$$C_{y_g} = \text{Lat} - R.\sin(\gamma_g)$$

$$\gamma_g = \delta.\text{Heading} + k.\Pi$$

The system (7) of parametric equations for the speed in the ground reference frame $X_t Y_t$ makes it possible to evaluate the longitudinal and lateral dimensions of the horizontal maneuvering area required by the aircraft to perform a complete revolution to the right or to the left.

Specifically, if we assume that the real air speed of the aircraft is greater than that of the local wind, the longitudinal and lateral speeds of the aircraft describing one or the other of the cycloidal arches corresponding to a turn to the right or to the left vanish periodically. FIG. 4 shows this phenomenon in the particular case of a crosswind W. Distinguished therein, on the first cycloidal arch of each trace 40, 41, are two positions 42, 43 for the trace 40 of the turn to the left and 44, 45 for the trace 41 of the turn to the right where the longitudinal speed vanishes and two positions 46, 47 for the trace 40 of the turn to the left and 48, 49 for the trace 41 of the turn to the right where the lateral speed vanishes.

The ordinates of the positions of the first 42 on the trace 40 and respectively 44 on the trace 41, and of the second vanishing 43 on the trace 40 and respectively 45 on the trace 41, of longitudinal speed advise as to the longitudinal extents of the maneuvering areas required to the right and to the left while the abscissae of the positions of the first 46 on the trace 40 and respectively 48 on the trace 41 advise as to the lateral extents of the maneuvering areas required.

The traversal times $t_{Ll1}$, $t_{Lr1}$ and $t_{Ll2}$, $t_{Lr2}$ required by the aircraft to reach the positions of the first and second vanishings of longitudinal speed 42, 43 or 44, 45 on the traces 40 and 41 are deduced from the equations for the speed on these traces. For convenience, we are concerned with a single trace for which the traversal time required to reach the first vanishing of longitudinal speed is denoted $t_{L1}$ and the traversal time required to reach the second vanishing $t_{L2}$. The equation for the speed is given by the relation:

$$(\dot{x})_t(t) = (Rw.\cos(wt + \gamma_t) + WS_{y_t})$$

When:

$$(\dot{x})_t(t) = 0$$

it follows that:

$$\begin{pmatrix} t_{L1} \\ t_{L2} \end{pmatrix} = \begin{cases} \frac{1}{w}\left[\arccos\left(-\frac{WS_{Yt}}{TAS} - \gamma_t\right) + 2k \cdot \Pi\right] \\ \frac{1}{w}\left[-\arccos\left(-\frac{WS_{Yt}}{TAS} - \gamma_t\right) + 2k \cdot \Pi\right] \end{cases}$$

with the integer k such that:

$$t = \begin{cases} wt > 0 \\ wt < 2 \cdot \Pi \end{cases}$$

and the ordinates $y_t(t_{L1})$ and $y_t(t_{L2})$ of the equations:

$$y_t(t_{L1}) = WS_{Yt} t_{L1} + R.\sin(wt_{L1} + \gamma_t) - R.\sin(\gamma_t)$$

$$y_t(t_{L2}) = WS_{Yt} t_{L2} + R.\sin(wt_{L2} + \gamma_t) - R.\sin(\gamma_t)$$

which is derived from the system (8) of parametric equations for the ground trace, with:

$$\gamma_t = -\delta.(\text{Track} - \text{Heading})$$

Taking account of the variety of the possible shapes of the cycloidal arches of the traces 40, 41 as a function of the force and of the orientation of the local wind W with respect to the heading and to the air speed of the aircraft, we choose to give the longitudinal dimension $L_f$, directed towards the front of the aircraft, of the right and left protection envelopes, the largest value out of:

the turning diameter 2R whose value is given by the relation:

$$R = \frac{TAS^2}{g \cdot \tan\varphi_{roll}},$$

and the values taken by the component $y_t$ of the parametric equation systems (8) for the ground traces 40, 41 at the times $t_{Ll1}$, $t_{Ll2}$, $t_{Lr1}$ and $t_{Lr2}$, $$L_f = \text{Max}\left[2R;\ y_t(t_{Ll1});\ y_t(t_{Ll2});\ y_t(t_{Lr1});\ y_t(t_{Lr2})\right]$$

Again, because of the large variety of the possible shapes of the arches of the cycloid, we choose to refer, for the longitudinal dimension $L_r$, directed towards the rear of the aircraft, of the right and left lateral protection envelopes, to the ordinate of the rearmost position of the aircraft where the longitudinal speed vanishes, which is given by the expression:

$$\text{Min}[y_t(t_{Ll1});\ y_t(t_{Ll2});\ y_t(t_{Lr1});\ y_t(t_{Lr2})]$$

As the ordinate of the rearmost position of the aircraft can be negative, we adopt, as longitudinal dimension $L_r$ directed towards the rear of the aircraft, the absolute value of the ordinate of the rearmost position of the aircraft where the longitudinal speed vanishes:

$$L_r = \text{Abs}(\text{Min}[y_t(t_{Ll1});\ y_t(t_{Ll2});\ y_t(t_{Lr1});\ y_t(t_{Lr2})])$$

In the same manner, the traversal times $t_{W1}$ and $t_{W2}$ required by the aircraft to reach the positions of the first and second vanishings of lateral speed 46, 47 or 48, 49 on a trace 40 or 41 are deduced from the relation derived from the system (7) of parametric equations:

$$(\dot{x})_t(t) = (\delta.Rw.\sin(wt + \gamma_t) + WS_{Xt})$$

with:

$$(\dot{x})_t(t) = 0$$

It follows that:

$$\begin{pmatrix} t_{W1} \\ t_{W2} \end{pmatrix} = \begin{cases} \frac{1}{w}\left[\arcsin\left(-\delta\frac{WS_{Xt}}{TAS} - \gamma_t\right) + 2k \cdot \Pi\right] \\ \frac{1}{w}\left[-\arcsin\left(-\delta\frac{WS_{Xt}}{TAS} - \gamma_t\right) + (2k + 1) \cdot \Pi\right] \end{cases}$$

with the integer k such that:

$$t = \begin{cases} wt > 0 \\ wt \leq 2 \cdot \Pi \end{cases}$$

and the abscissae $x_t(t_{W1})$ and $x_t(t_{W2})$ of the equations:

$x_t(t_{W1})=WS_{Xt}t_{W1}-\delta.R.\cos(wt_{W1}+\gamma_t)+\delta.R.\cos(\gamma_t)$ $x_t(t_{W2})=WS_{Xt}t_{W2}-\delta.R.\cos(wt_{W2}+\gamma_t)+\delta.R.\cos(\gamma_t)$ derived from the system (8) of parametric equations for the ground trace, with:

$\gamma_t=-\delta.(\text{Track}-\text{Heading})$

Because of the large variety of the possible shapes of the cycloidal arches of the traces 40 and 41, we choose, for the lateral dimension $W_r$ of the right lateral protection envelope the larger value out of:

the turning diameter 2R whose value is given by the relation:

$$R = \frac{TAS^2}{g \cdot \tan\varphi_{roll}}, \text{ and}$$

the values taken by the component $x_t$ of the system of parametric equations (8) for the ground trace at the times $t_{Wr1}$ and $t_{Wr2}$ increased by the width Wn of the navigation band, that is to say of the uncertainty of positioning of the aircraft, laterally with respect to the course scheduled in its flight plan:

$W_r=\text{Max}[2R; x_t(t_{Wr1}); x_t(t_{Wr2})]+Wn$ with $\delta=+1$ and for the lateral dimension $W_l$ of the left lateral protection envelope, the larger out of:

the turning diameter 2R whose value is given by the relation:

$$R = \frac{TAS^2}{g \cdot \tan\varphi_{roll}}, \text{ and}$$

the opposites of the values taken by the component $x_t$ of the system of parametric equations (8) for the ground trace at the times $t_{W71}$ and $t_{W72}$ (to take account of their negative signs in the terrestrial reference frame t)

increased by the width Wn of the navigation band, that is to say of the uncertainty of positioning of the aircraft, laterally with respect to the course scheduled in its flight plan:

$W_r=\text{Max}[2R;-x_t(t_{W71});-x_t(t_{W72})]+Wn$ with $\delta=-1$

Figure 5:
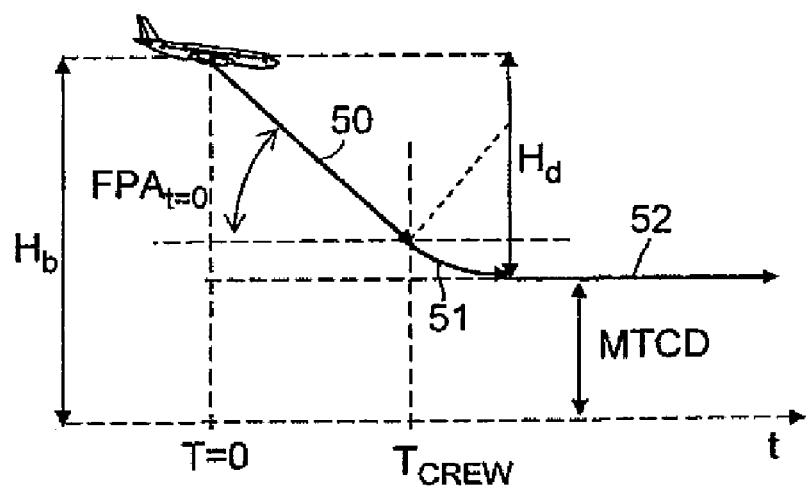

The dimension $H_b$, in the vertical plane, of the right and left lateral protection envelopes is chosen, as shown in FIG. 5, so as to contain a safety margin MTCD (acronym derived from the expression: "Minimum Terrain Clearance Distance") which may be that used by a TAWS system, increased by a possible vertical margin Hd for flattening out if the aircraft is descending.

As shown in FIG. 5, the vertical trajectory followed by an aircraft in the descent phase whose crew has taken the decision to exit the descent trajectory scheduled in its flight plan by a change of heading after flattening out may be broken down into three phases:

an initial phase 50 extending for a reaction time $T_{crew}$ allowed to the crew to embark on the flattening out maneuver, during which the aircraft retains its angle of descent, the phase of flattening out 51 during which the aircraft flattens out horizontally with a constant normal acceleration factor n, of for example 0.5, and a final phase 52 where the aircraft continues its flight horizontally.

In this case, the vertical margin for flattening out can be estimated by means of the relation:

$$H_d = Z_{t=0} + GS_{t=0} \cdot T_{crew} \cdot \tan(FPA_{t=0}) + \frac{GS_{t=0}^2}{n \cdot g}(\cos(FPA_{t=0}) - 1)$$

$Z_{t=0}$ being the initial altitude of the aircraft,
$GS_{t=0}$ being the initial ground speed of the aircraft,
$FPA_{t=0}$ the initial slope angle of the vertical trajectory of the aircraft,
n being the normal acceleration factor used during the flattening out maneuver, and
g being the acceleration due to gravity.

Ultimately, we estimate the dimension $H_b$, in the vertical plane, of the right and left lateral protection envelopes 6 and 7 on the basis of the relation:

$$H_b = Z_{t=0} + GS_{t=0} \cdot T_{crew} \cdot \tan(FPA) + \frac{GS_{t=0}^2}{n \cdot g}(\cos(FPA) - 1) - MTCD$$

FPA being a slope angle taken equal to the initial slope angle $FPA_{t=0}$ when the latter is negative and to zero when the initial slope angle $FPA_{t=0}$ is positive or zero:

$FPA=FPA_{t=0}$ if $FPA_{t=0}<0$ (aircraft descending)

$FPA=0$ if $FPA_{t=0}\geq 0$ (aircraft climbing or flat)

The invention claimed is:

1. A method for evaluating and signaling the lateral margins of maneuver on either side of a trajectory scheduled in the flight plan of an aircraft furnished with a locating device and with a cartographic device formulating, on the basis of a topographic database onboard or accessible from onboard, an envelope of the terrain overflown comprising the steps of:

generation, on the basis of a position of the aircraft traveling along the trajectory scheduled in the flight plan, of two adjoining lateral protection envelopes, right and left extending one to the right and the other to the left of a navigation band centered on the trajectory scheduled in the flight plan and of width Wn taking account of the uncertainties of location of the aircraft, of the inaccuracy of the envelope of the terrain overflown delivered by the cartographic device and of a lateral tolerance accepted in the tracking of the trajectory scheduled in the flight plan, the right lateral protection envelope delimiting a sufficient volume to allow the aircraft to perform at least one half-revolution, flat, to the right, during a turn with imposed radius R, the left lateral protection envelope also delimiting a sufficient volume to allow the aircraft to perform at least one half-revolution, flat, to the left, during a turn with imposed radius, and detection of the intrusions of the envelope of the terrain overflown into the right and left lateral protection envelopes, and signaling of the passages of the trajectory scheduled in the flight plan with reduced margins of lateral maneuver on the right and/or on the left corresponding to intrusions of the envelope of the terrain overflown into one or the other of the right or left lateral protection envelope;

wherein the longitudinal and lateral dimensions of the right and left lateral protection envelopes are dependent on the imposed turning radius R and the positions, with respect to the aircraft, of the points of the ground traces of the turns with the imposed radius R corresponding, for the aircraft, to a vanishing of its speed component perpendicular to the course scheduled in its flight plan.

2. The method as claimed in claim 1, wherein a limitation of lateral margin of maneuver at a point of the trajectory scheduled in the flight plan is signaled on a navigation map by a doubling of the plot of the trajectory at the point concerned, on the side of each right or left lateral protection envelope having undergone an intrusion of the envelope of the terrain overflown.

3. The method as claimed in claim 1, wherein the right and left lateral protection envelopes are dimensioned so as to delimit a sufficient volume to allow the aircraft to perform a complete revolution, flat, to the right or to the left while taking account of the local wind W.

4. The method as claimed in claim 1, wherein the turning radius R imposed is a permitted minimum turning radius for the aircraft considered.

5. The method as claimed in claim 1, wherein the right and left lateral protection envelopes are of parallelepipedal shape, with a horizontal lower face placed below the aircraft at a vertical distance $H_b$ corresponding to a safety height margin MTCD increased by a margin of maneuver of return to the horizontal $H_d$, two vertical lateral faces, one tangent to the course of the aircraft, the other shifted laterally from the aircraft by the necessary distance $W_r$, Wl required by the aircraft to accomplish a half-revolution taking account of the local wind W and the imposed turning radius R, a vertical frontal face and a vertical rear face having the course of the aircraft as director axis, the frontal face being placed ahead of the aircraft at a distance $L_f$ corresponding to that necessary for the aircraft to accomplish a quarter of a revolution taking account of the local wind Ws and the imposed turning radius R, and the rear face being spaced from the front face by the distance necessary for the aircraft to supplement the quarter of a revolution with a half-revolution taking account of the local wind W and the imposed turning radius R.

6. The method as claimed in claim 1, wherein the right and left lateral protection envelopes have one and the same longitudinal dimension.

7. The method as claimed in claim 6, wherein the right and left lateral protection envelopes have as longitudinal dimension the sum of a component $L_f$ directed towards the front of the aircraft, taken equal to the largest value out of:

the turning diameter 2R whose value is given by:

$$R = \frac{TAS^2}{g \cdot \tan\varphi_{roll}},$$

TAS being the amplitude of the air speed of the aircraft, $\varphi_{roll}$ being the angle of roll of the aircraft during the turning maneuver, g being the acceleration due to gravity, and the values taken by the component $y_t$ parallel to the course scheduled in the flight plan, of the separation of the positions on the ground traces of turns to the right and to the left, with the imposed radius R, at the times $t_{LR1}$, $t_{Ll1}$ and $t_{Lr2}$, $t_{Ll2}$ of the first and second vanishings of the aircraft's speed component parallel to the course scheduled in the flight plan $$L_f = \text{Max}[2R; y_t(t_{Ll1}); y_t(t_{Ll2}); y_t(t_{Lr1}); y_t(t_{Lr2})]$$

and of a component $L_r$, directed towards the rear of the aircraft, taken equal to the absolute value of the smallest of the values taken by the component $y_t$ parallel to the course scheduled in the flight plan on the ground traces of turns to the right and to the left, with the imposed radius, at the times $t_{Lr1}$, $t_{Ll1}$ and $t_{Lr2}$, $t_{Ll2}$ of the first and second vanishings of the aircraft's speed component parallel to the course scheduled in the flight plan:

$$L_r = \text{Abs}(\text{Min}[y_t(t_{Ll1}); y_t(t_{Ll2}); y_t(t_{Lr1}); y_t(t_{Lr2})]).$$

8. The method as claimed in claim 1, wherein the lateral dimensions of the two right and left lateral protection envelopes have as lateral dimensions, the one, the right one $W_r$, the largest value out of:

the turning diameter 2R whose value is given by:

$$R = \frac{TAS^2}{g \cdot \tan\varphi_{roll}}$$

TAS being the amplitude of the air speed of the aircraft, $\varphi_{roll}$ being the angle of roll of the aircraft during the turning maneuver, and the values taken by the component $x_t$ perpendicular to the course scheduled in the flight plan on the ground trace of the turn with imposed radius, at the times $t_{Wr1}$ and $t_{Wr2}$ of the first and second vanishings of the aircraft's speed component perpendicular to the course scheduled in the flight plan, increased by the width Wn of the navigation band:

$$W_r = \text{Max}[2R; x_t(t_{Wr1}); x_t(t_{Wr2})] + Wn \text{ with } \delta = +1$$

and the other, the left one $W_l$, the largest value out of:

the turning diameter 2R, the opposites of the values taken by the component $x_t$ perpendicular to the course scheduled in the flight plan on the ground trace of the turn with imposed radius, at the times $t_{Wl1}$ and $t_{Wl2}$ of the first and second vanishings of the aircraft's speed component perpendicular to the course scheduled in the flight plan increased by the width Wn of the navigation band.

* * * * *